United States Patent
Kiessling et al.

(10) Patent No.: US 6,548,105 B2
(45) Date of Patent: Apr. 15, 2003

(54) METHOD FOR PARTIALLY COATING A CARRIER BODY

(75) Inventors: Ralph Kiessling, Limeshain (DE); Josef Piroth, Mespelbrunn (DE)

(73) Assignee: DMC2 Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/813,933

(22) Filed: Mar. 22, 2001

(65) Prior Publication Data

US 2001/0024686 A1 Sep. 27, 2001

(30) Foreign Application Priority Data

Mar. 23, 2000 (DE) .......................... 100 14 547

(51) Int. Cl.[7] .............. B05D 7/22; B05D 1/18; B05D 3/02
(52) U.S. Cl. .......... 427/8; 427/230; 427/238; 427/430.1; 427/372.2
(58) Field of Search ............ 427/430.1, 443.2, 427/372.2, 230, 238, 239, 8; 502/439, 514

(56) References Cited

U.S. PATENT DOCUMENTS

| | | | | |
|---|---|---|---|---|
| 3,621,909 A | * | 11/1971 | Smith, Jr. .................. 165/168 |
| 4,039,482 A | * | 8/1977 | Hoyer et al. ........... 252/466 PT |
| 4,208,454 A | * | 6/1980 | Reed et al. ................. 427/238 |
| 4,550,034 A | * | 10/1985 | Shimrock et al. ........... 427/243 |
| 5,165,970 A | * | 11/1992 | Schmidt et al. .......... 427/430.1 |
| 5,558,714 A | * | 9/1996 | Watanabe et al. ........... 118/421 |
| 5,866,210 A | * | 2/1999 | Rosynsky et al. .......... 427/294 |
| 5,990,807 A | * | 11/1999 | Cloutier et al. ........ 340/870.37 |

* cited by examiner

Primary Examiner—Michael Barr

(57) ABSTRACT

A method for partially coating a cylindrical carrier body with a coating suspension, the carrier body having a cylindrical axis, two end faces, an envelope, and an axial length L, and being provided with a series of channels extending from the first end face to the second end face. A desired coating quantity of the coating suspension is applied onto the carrier body by vertically aligning the cylindrical axis and introducing the coating suspension into the channels through the lower end face. The carrier body, measured from the lower end face, is filled with a filling volume of the coating suspension which is metered, such that the carrier body is only filled up to a height that amounts to a predetermined fraction of its length L. Subsequently, excess coating suspension is removed downward so that the desired coating quantity remains on the carrier body.

7 Claims, 4 Drawing Sheets

METHOD FOR PARTIALLY COATING A CARRIER BODY

INTRODUCTION AND BACKGROUND

The present invention pertains to a method for partially coating a cylindrical carrier body with a coating suspension. The invention pertains, in particular, to a method for coating carrier bodies for catalysts—for example, automobile exhaust gas catalysts.

Carrier bodies for automobile exhaust gas catalysts have a cylindrical shape with two end faces and an exterior surface jacket, and are provided with a series of flow channels for the exhaust gases of the internal combustion engine which lie parallel to the cylindrical axis extending from the first end face to the second end face. These carrier bodies are also referred to as honeycomb bodies.

The cross-sectional shape of the carrier body depends on the installation requirements of the motor vehicle. Carrier bodies with round, elliptical or triangular cross sections are broadly utilized. The flow channels usually have a square cross section and are arranged tightly adjacent to one another over the entire cross section of the carrier body. Depending on the type of application, the channel or cell density of the flow channels varies between 10 and 120 $cm^{-2}$. Honeycomb bodies with cell densities up to 250 $cm^{-2}$ and more are being developed.

Catalyst carrier bodies obtained by extruding ceramic masses are primarily used for purifying automobile exhaust gases. Alternatively, catalyst carrier bodies consisting of metal foils that are corrugated and subsequently wound are also available. Today, ceramic carrier bodies with cell densities of 62 $cm^{-2}$ are still predominantly used for purifying exhaust gases of passenger cars. The cross-sectional dimensions of the flow channels are 1.27×1.27 $mm^2$ in this case. The wall thicknesses of such carrier bodies lie between 0.1 and 0.2 mm.

Dispersed metals of the platinum group, the catalytic effect of which may be altered by compounds of base metals, are most frequently utilized for converting the harmful substances contained in automobile exhaust gases, e.g., carbon monoxide, hydrocarbons and nitrogen oxides, into harmless compounds. These catalytically active components need to be deposited on the carrier bodies. However, it is impossible to ensure the required dispersion of the catalytically active components on the geometric surfaces of the carrier body by depositing these components. This applies to non-porous metallic carrier bodies as well as porous ceramic carrier bodies. A sufficiently large surface for the catalytically active components can only be provided by applying a support layer of fine-particle, high surface area materials onto the inner surfaces of the flow channels. This process is referred to in the following as the coating of the carrier body. A coating of the outer envelope, or exterior surface jacket, of the carrier body is undesirable and should be prevented in order to avoid losses of valuable catalytically active materials.

A suspension of the fine-particle, high surface area materials in a liquid phase, usually water, serves for coating the carrier bodies. Various methods for depositing the support layer on the carrier body, by utilizing the coating suspension or slurry, are known from the state of the art. The coating is, for example, realized by immersing the carrier body in the coating suspension or by pouring the coating suspension over the carrier body. It is also possible to pump or attract the coating suspension by suction into the channels of the carrier body. Excess coating material always needs to be removed from the channels of the carrier body by means of suction or compressed air. This also ensures that channels which might have become clogged with coating suspension are opened.

After the coating process, the carrier body and the support layer are dried and subsequently calcined, in order to solidify and fix the support layer on the carrier body. Subsequently, catalytically active components are introduced into the coating by means of an impregnation with usually aqueous solutions of precursor compounds of the catalytically active components. Alternatively, the catalytically active components can be added into the coating suspension. In this case, a subsequent impregnation of the finished support layer with catalytically active components is not necessary.

One essential criterion of the coating method is that the coating or charging concentration can be achieved in one cycle. This refers to the portion of solids which remains on the carrier body after the drying and calcining processes. The coating concentration is expressed in grams per liter of the volume of the carrier body (g/L). In practical applications, coating concentrations up to 300 g/L are required for automobile exhaust gas catalysts. If this quantity cannot be applied in one cycle with the respectively utilized method, the coating process must be repeated after drying and, if applicable, calcining the carrier body until the desired concentration is reached.

DE 40 40 150 C2 describes a method in which catalyst carrier bodies having a honeycomb shape can be uniformly coated with a support layer, or with a catalytically active layer, over their entire length. In the following description, catalyst carrier bodies with a honeycomb shape are also referred to as honeycomb bodies. According to the method described in DE 40 40 150 C2, the cylinder axis of the honeycomb body is vertically aligned for the coating process. Subsequently, the coating suspension is pumped into channels through the lower end face of the honeycomb body until it emerges at the upper end face. The coating suspension is then pumped off downward and excess coating suspension is removed from the channels by means of suction or compressed air in order to prevent clogging of the channels. Support layers that have an adequate uniformity over the entire length of the honeycomb body can be obtained with this method.

U.S. Pat. No. 4,550,034 and U.S. Pat. No. 4,609,563 describe a method for coating ceramic honeycomb bodies in which a predetermined quantity of a coating suspension is filled into a flat container and the honeycomb body to be coated is immersed into the suspension with one of its end faces. The predetermined quantity of the coating suspension corresponds to the desired coating quantity for the honeycomb body. Subsequently, the entire quantity of the coating suspension is attracted by suction into the flow channels of the honeycomb body by applying a vacuum to the second end face. Since the predetermined quantity of the coating suspension corresponds to the coating quantity required for the honeycomb body, no removal of excess coating suspension from the flow channels takes place after the coating suspension is introduced into the flow channels. The coating process is preferably carried out in two steps, with 50–85% of the required coating quantity being attracted by suction from the first end face in the first step, and with the remaining coating quantity being attracted by suction into the flow channels from the second end face of the honeycomb body.

A high reproducibility of the coating concentration can be achieved with the method described in these two patents.

However, the thickness of the coating along the honeycomb body has a significant gradient in the catalysts manufactured in this manner. Also, the preferred coating of the honeycomb body in two steps is unable to sufficiently improve the uniformity of the coating along the honeycomb body.

Certain applications require catalysts that have regions with different catalytic activities along the catalyst carrier body. For example, EP 0 410 440 B1 describes a catalyst that consists of two partial catalysts—namely a catalyst on the inflow side which serves for achieving a selective catalytic reduction of nitrogen oxides by means of ammonia or a compound that supplies ammonia and an oxidation catalyst on the outflow side. In this case, the oxidation catalyst is applied in the form of a coating onto a section of the one-piece reduction catalyst that is fully extruded in a honeycomb shape, which section is situated on the outflow side, with the section on the outflow side amounting to 20–50% of the total catalyst volume. The application of the oxidation catalyst is realized by immersing the outflow side of the honeycomb body into the coating suspension for the oxidation catalyst, up to the desired length.

DE 195 47 597 C2 and DE 195 47 599 C2 describe the reinforcement of the end faces of monolithic catalysts for purifying exhaust gases by applying or introducing inorganic materials that reinforce the mechanical properties of the carrier body or the catalytic coating. The length of the reinforced zone may, measured from the respective end face, amount up to twenty times that of the channel diameter. In order to carry out this coating process, it is proposed to immerse the catalyst body into a suspension of the reinforcing materials or to spray this suspension onto the end faces of the body.

These examples show that there is a significant demand for coating methods for partially coating honeycomb bodies or carrier bodies. U.S. Pat. No. 5,866,210 describes such a method. The coating is realized by immersing one end face of the substrate into a bath containing the coating suspension. This bath contains an excess quantity of the coating suspension in comparison to the quantity required for coating the substrate up to a desired height. A vacuum is then applied to the second end face, with the intensity and duration of this vacuum sufficing for attracting the coating suspension into the channels by suction up to the desired height. In this case, it is attempted to achieve the most uniform coating height possible in all channels.

In the following, the transition between the freshly coated region of the carrier body and the remaining region of the carrier body is referred to as the coating edge.

The method according to U.S. Pat. No. 5,866,210 has several significant disadvantages. The height of the coating or its axial length is determined by the utilization of capillary forces as well as the intensity of the applied vacuum and the duration during which the vacuum is applied to the second end face of the carrier body. Values of 1–3 seconds are indicated for this duration. Changes in the viscosity of the coating suspension consequently lead to direct changes in the length of the applied coating, i.e., to an inferior reproducibility of the coating edge. The intensity of the vacuum is indicated in this U.S. patent as no more than 1 inch water column which corresponds to approximately 2.5 mbar. The precise control of this slight vacuum is also complicated and can result in additional problems regarding the reproducibility of the coating method. Due to the slight vacuum, only coating suspensions with a low viscosity can be processed with this method. This means that the suspensions used usually have a low solids content. This low solids content, in turn, requires that several coating processes be carried out successively in order to achieve a high coating concentration.

In the method according to U.S. Pat. No. 5,866,210, the capillary forces are very important. This means that this method is dependent upon the cell density of the carrier body to be coated.

After the coating suspension has reached the desired height in the flow channels, the carrier body is lifted at the second end face while the vacuum is preserved such that the contact with the coating suspension is interrupted. Due to the continued vacuum on the second end face, air is conveyed through the flow channels and the coating is at least partially dried. During this phase of the coating process, the vacuum is increased to 5–15 inch water column and maintained for an additional 2–4 seconds. Due to this measure, the coating edge may become smeared.

The present invention relates to a method for partially coating carrier bodies which makes it possible to use coating suspensions with a high solids content, and to achieve a high reproducibility of the position of the coating edge in the channels, with the reproducibility being largely independent of the cell density of the carrier body.

SUMMARY OF THE INVENTION

The above and other objectives of the invention can be attained with a method for partially coating a cylindrical carrier body with a coating suspension, in which the carrier body has a cylindrical axis, two end faces, an exterior surface jacket, and an axial length L, and a series of channels extending from the first end face to the second end face. A desired coating quantity of the coating suspension is applied onto the carrier body by vertically aligning the cylindrical axis and introducing the coating suspension through the lower end face. It is a feature of the method that the carrier body, measured from the lower end face, is filled with a filling volume of the coating suspension which is metered such that the carrier body is only filled up to a height that amounts to a predetermined fraction of its length L, and by the fact that excess coating suspension is removed downward such that the desired coating quantity remains on the carrier body.

It is essential for the method according to the invention that a defined filling volume of the coating suspension be introduced into the channels of the carrier body. Consequently, the filling volume corresponds to the empty volume of the channels up to the desired coating height. In the present method, the coating height consequently is adjusted by means of an exact volumetric metering of the coating suspension, with the coating height merely being determined indirectly in the form of a cooperation between several variables, e.g., capillary forces, vacuum and viscosity, in the methods known from the state of the art.

When carrying out this method, the filling volume needs to be increased by additional volume portions, namely the volume portions of required pipelines and, if applicable, other parts of the apparatus required for carrying out the method.

The filling quantity introduced into the channels of the carrier body is obtained by multiplying the filling volume of the coating suspension with the density of the coating suspension. One needs to differentiate between the filling quantity, the volume of which determines the coating height, and the desired coating quantity, which represents the coating quantity after excess coating suspension is removed from the channels of the carrier body. The quantity of the coating suspension which is introduced into the carrier body consequently is always larger than the coating quantity. The coating is dried and, if applicable, calcined after the excess coating suspension has been removed.

BRIEF DESCRIPTION OF THE DRAWINGS

The present invention will be further understood with reference to FIGS. 1–4, wherein.

DETAILED DESCRIPTION OF THE INVENTION

Figure 1:
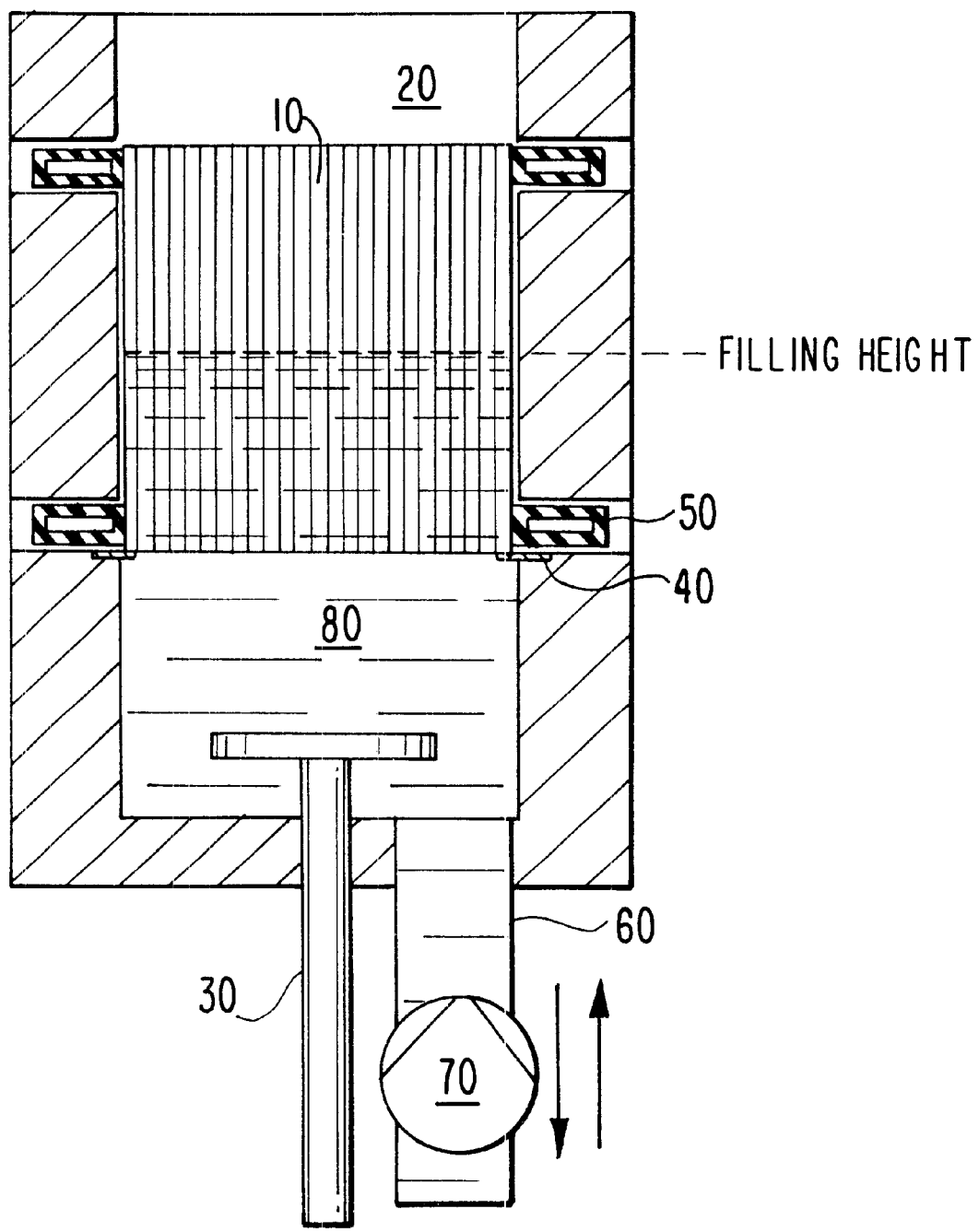
FIG. 1 is a schematic cross-sectional view of a device for carrying out the method with a reversible metering pump.

The new method makes it possible to coat ceramic as well as metallic carrier bodies. FIG. 1 shows one possible apparatus for carrying out this method.

The coating device consists of an immersion chamber (20), into which the carrier body (10) to be coated is introduced from the top by means of a vertically displaceable ram (30) and deposited on the holding elements (40). The carrier body is fixed in the device by inflating inflatable rubber collars (50). These collars simultaneously serve for sealing the exterior surface of the carrier body relative to the coating suspension. The immersion chamber can be filled with coating suspension and emptied from the bottom via the pipeline (60). A reversible metering pump (70) that pumps the coating suspension (80) into the immersion chamber from a not-shown reservoir serves for introducing the coating suspension into the channels of the carrier body. The metering pump also serves for removing excess coating suspension from the channels and for pumping said coating suspension back into the reservoir. Consequently, the filling volume is metered with the aid of the metering pump in this case.

Figure 2:
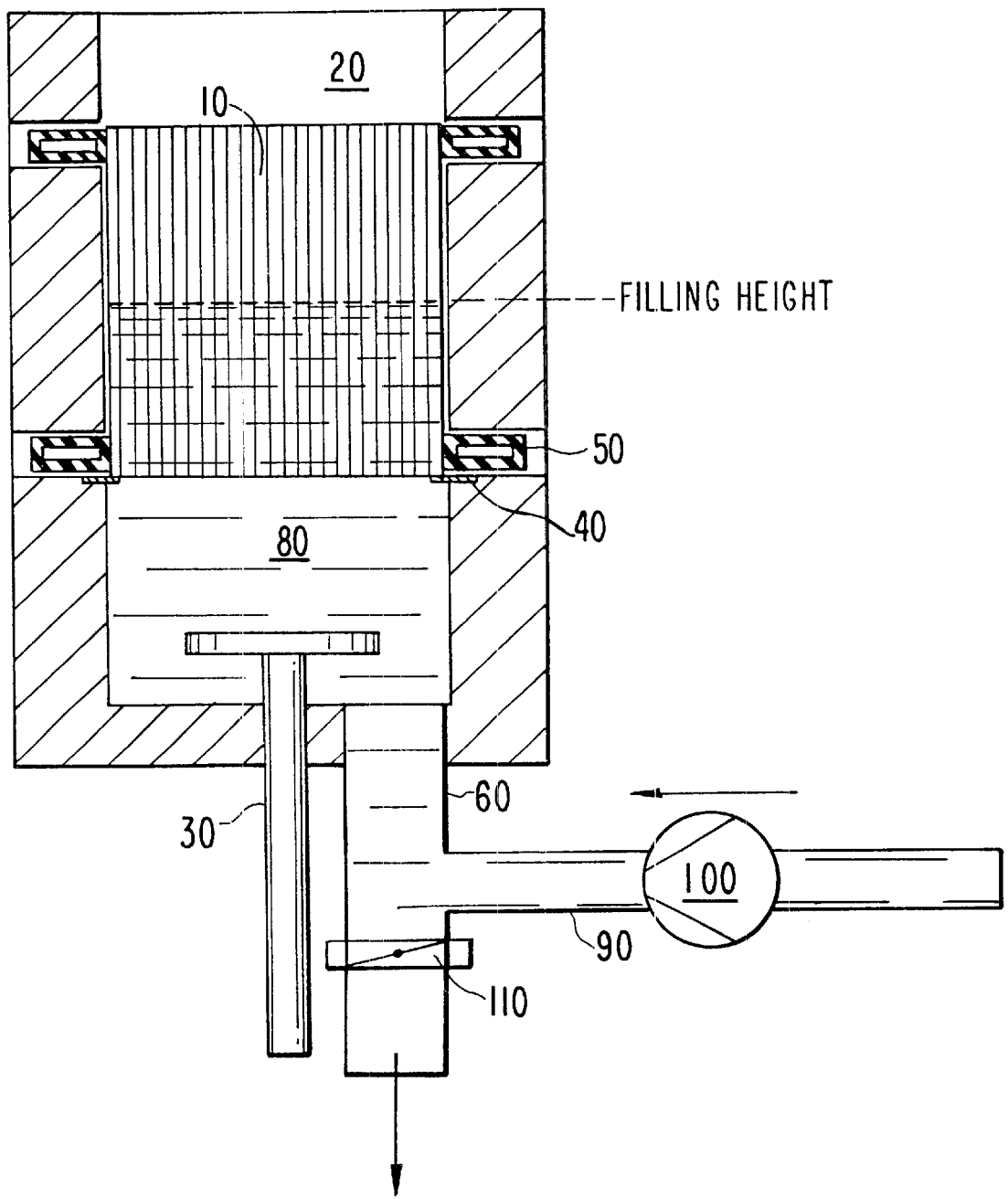
FIG. 2 is a schematic cross-sectional view of a device for carrying out the method with a metering pump and the removal of excess coating suspension by suction.

The apparatus according to FIG. 2 provides an alternative option. This apparatus contains an additional pipeline (90) that is connected to the reservoir for the coating suspension in this case. The coating suspension is pumped into the channels of the carrier body with the aid of the metering pump (100). The metering of the filling volume consequently is also realized with the aid of the metering pump in this case. The pipeline (90) ends in the pipeline (60) that is connected above a butterfly valve (110) to a not-shown vacuum vessel with a demister. Excess coating suspension is removed by suction from the channels of the carrier body after opening the butterfly valve. A circuit for the coating suspension can be easily created by utilizing two separate pipelines for filling and emptying the carrier body. The vacuum vessel is connected to a fan that maintains a vacuum between 50 and 500, preferably 300 mbar. The intensity and the duration of the removal by suction can be adjusted with the aid of the butterfly valve. The intensity and the duration of the removal by suction determine, among other things, the coating quantity which remains on the carrier body.

An improved reproducibility of the coating height can be achieved if the filling volume is metered with the aid of a metering valve, at the inlet of which the coating suspension is subjected to a pressure. The metering valve is controlled based on the signal of a sensor. The signal of the sensor signals that the desired coating height has been reached and controls the closing of the metering valve. Excess coating suspension can be pumped off or removed by suction from the channels of the carrier body.

The variations of the method which were described so far are suitable for ceramic carrier bodies as well as carrier bodies consisting of metal foils. One particularly advantageous embodiment of the latter variation of the method applies to carrier bodies of ceramic materials. In this case, a capacitive sensor easily and accurately signals that the coating height has been reached, with the sensor being arranged at the desired height above the lower end face of the carrier body at a distance from the envelope of the carrier body. Capacitive sensors are broadly utilized in technical applications as proximity switches. The capacitive sensor can be arranged at the desired height at a distance from the envelope of the carrier body. Once the coating suspension rises to this height in the flow channels, the sensor responds. The response accuracy depends on the change in the relative dielectric constant. If an aqueous suspension is used, the response accuracy is very high because the relative dielectric constant changes from 1 (air) to approximately 80 (water) in this case. Such a sensor arrangement makes it possible to achieve excellent switch-off accuracies.

The distance between the envelope and the sensor head should lie between 0.5 and 25 mm. In this case, the carrier body cannot be shielded by a metallic surface that lies between the envelope and the sensor. It is proposed to manufacture the holding arrangement for the carrier body of a plastic material in this case. Tests have demonstrated that exceptionally good switch-off accuracies can still be achieved if the distance between the outer jacket of the carrier body and the sensor head is 15 mm. A plastic wall that is inserted between the outer jacket and the sensor head does not influence the switch-off accuracy. This provides a person skilled in the art with a broad range of options in the construction of a suitable coating device for carrying out the method.

Figure 3:
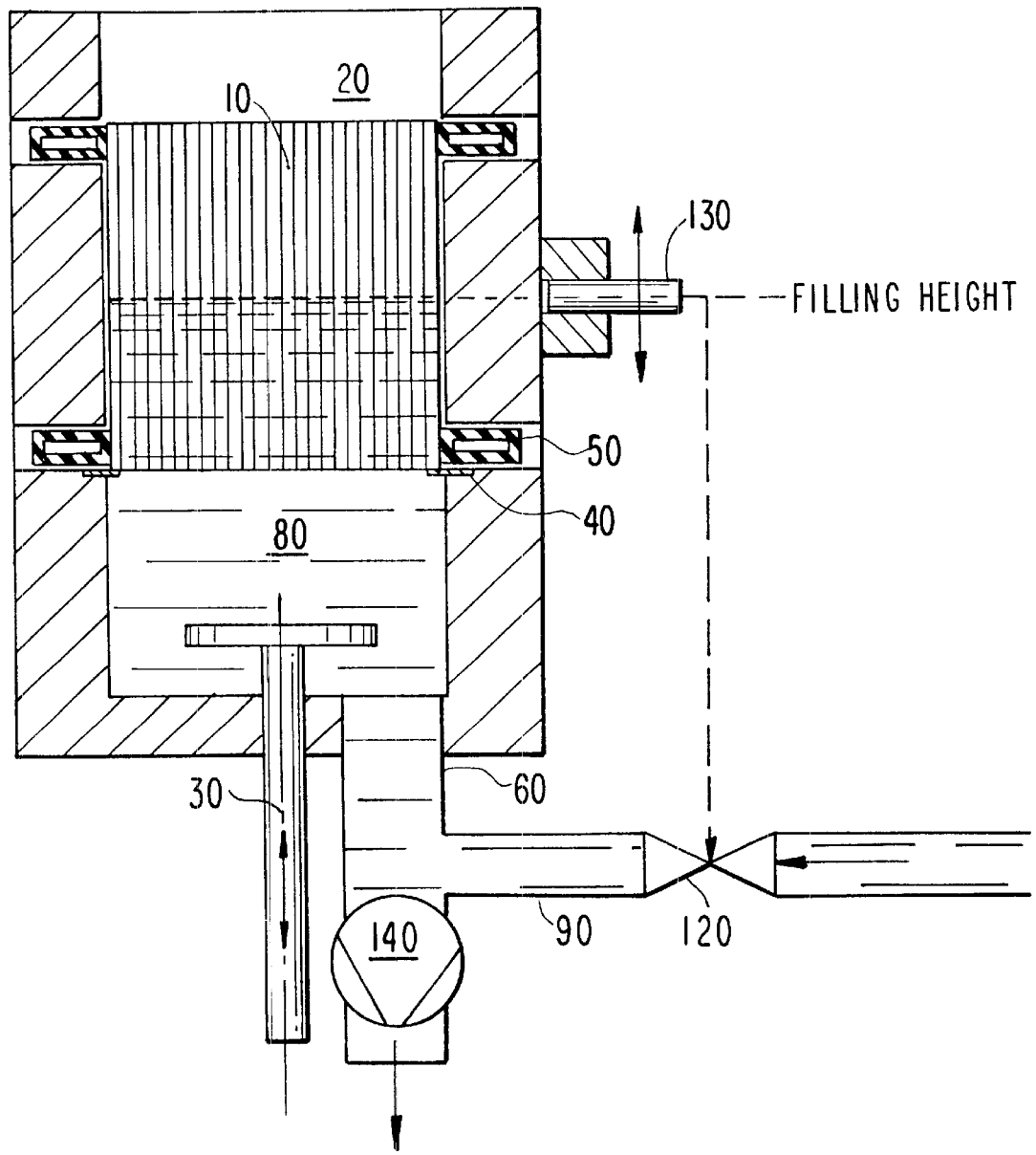
FIG. 3 is a schematic cross-sectional view of a device for carrying out the method with a metering valve and a pump for pumping off excess coating suspension.
Figure 4:
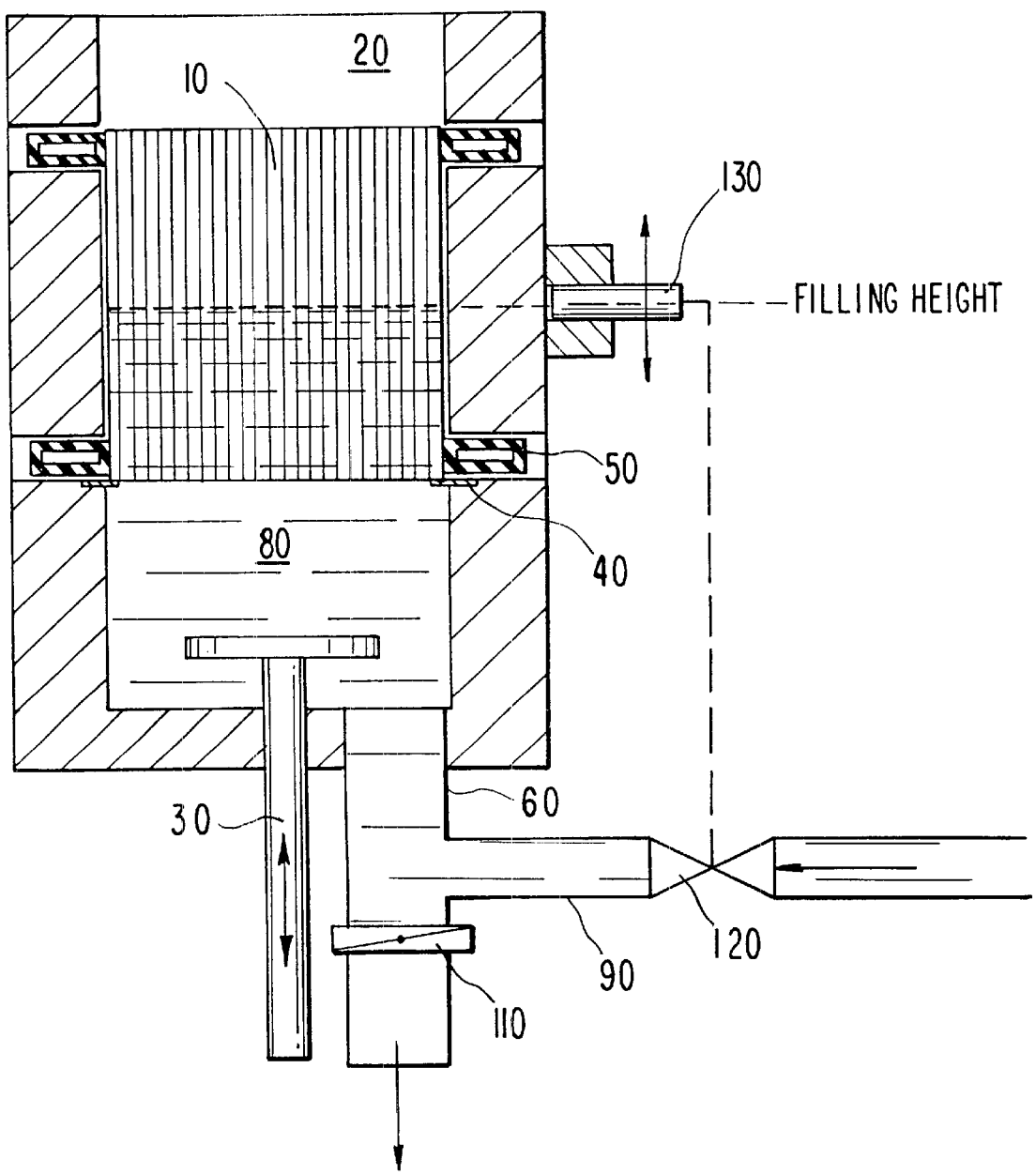
FIG. 4 is a schematic cross-sectional view of a device for carrying out the method with a metering valve and with removal of excess coating suspension by suction.

Another apparatus for carrying out this variation of the method is shown in FIGS. 3 and 4. In this case, a metering valve (120) is inserted into the pipeline (90). The capacitive sensor (130) that delivers a signal once the coating suspension has risen to the corresponding height in the flow channels is mounted on the immersion chamber at the desired coating height. The sensor is connected to the metering valve (120) via suitable control electronics. Once the sensor signals that the coating height has been reached, the electronics closes the metering valve and switches on the pump (140) for pumping off excess coating suspension, or opens the butterfly valve (110) that is connected to a vacuum vessel in order to remove the coating suspension from the channels of the carrier body by suction analogous to FIG. 2 (FIG. 4).

In all described variations of the new method, the carrier body is removed from the immersion chamber after the excess coating suspension is pumped off or removed by suction. In another device, flow channels that still might be clogged with excess coating suspension can be opened by means of a repeated removal by suction or with compressed air. In this case, the removal by suction or the blow-out by means of compressed air preferably also takes place downward in order to prevent smearing of the coating edge. Subsequently, the carrier body and the coating are dried and calcined.

According to the proposed method, the coating suspension is forcibly introduced into the carrier body from the bottom. The filling process is only completed once the intended filling volume is introduced into the carrier body. This means that the method is largely independent of the viscosity of the suspension. Thus, highly viscous coating suspensions with a high solids content can also be utilized, i.e., the required coating thickness can be achieved, with only one coating process. The viscosity of the coating suspension may be up to 500 mPas. Suspensions with a solids content of up to 60 wt. % can be processed. It is preferred to use coating suspensions with a solids content between 40 and 55 wt. %. Only one coating process is usually required for achieving coating concentrations of up to 200 g/L of the coated carrier body volume after the calcining process.

In all previously described embodiments of the method according to the invention, the speed with which the coating suspension is pumped into the carrier body should be chosen such that the desired coating height is reached in less than one second. Due to this measure, the influence of the absorbency of ceramic carrier bodies on the formation of the coating is minimized.

EXAMPLE

The following example is intended for elucidating the terms filling volume, filling quantity, and coating quantity, which are important for the invention:

A honeycomb body with a volume of 1.3 liter and a cell density of 62 $cm^{-2}$ was coated over half of its length measured from one end face.

The empty volume of the carrier body (volume of all channels) amounted to ¾ of the total volume, i.e., 1 liter. This means that the required filling volume amounted to 0.5 liter without taking into consideration the additional volumes of lines and the immersion chamber.

A coating suspension with a density of 1.5 kg/L and a solid content of 50 wt. % was used for the coating process. According to the required filling volume, this resulted in a calculated filling quantity of 750 g. After removing the excess coating suspension, a coating quantity of 300 g which resulted in a dry mass of 150 g after the calcining process remained on the carrier body.

Further variations and modifications of the foregoing will be apparent to those skilled in the art and are intended to be encompassed by the claims appended hereto.

German priority application 100 14 547.7 is relied on and incorporated herein by reference.

We claim:

1. A method of coating a ceramic cylindrical carrier body having a cylindrical axis, an exterior surface jacket, a first end face, a second end face, and a series of channels extending from the first end face to the second end face, the method comprising:

vertically aligning a cylindrical axis of the carrier body so that one of the end faces of the carrier body is a lower end face, and the other end face of the carrier body is an upper end face;

introducing a coating suspension into the series of channels of the carrier body through the lower end face, to fill the carrier body with a filling volume of the coating suspension to a predetermined height of the carrier body, which height is only a portion of an entire length of the carrier body; and removing excess coating suspension from the carrier body downward through the lower end face of the carrier body, wherein a capacitive sensor is positioned at the predetermined height at a distance from an exterior surface jacket of the carrier body to signal when the coating suspension inside the carrier body has reached the predetermined height to cease the filling of the carrier body.

2. The method according to claim 1, wherein the coating suspension filling volume is metered with a metering valve having an inlet at which the coating suspension is subject to a pressure, wherein the metering valve is closed once the capacitive sensor signals that the coating height has been reached.

3. The method according to claim 2, where in excess coating suspension is moved out of the channels during the removing step.

4. The method according to claim 2, wherein excess coating suspension is moved out of the channels during the removing step by suction.

5. The method according to claim 1, wherein the coating suspension is introduced into the carrier body at a speed such that the coating suspension reaches the predetermined height in less than one second.

6. The method according to claim 1, further comprising, after the removing step, opening any of the channels that are clogged with the coating suspension by suction or by compressed air.

7. The method according to claim 1, further comprising, drying and calcining the carrier body after the removing step.

* * * * *